(12) United States Patent
Shiraishi et al.

(10) Patent No.: US 12,304,531 B2
(45) Date of Patent: May 20, 2025

(54) DEVICE AND METHOD FOR GENERATING TRAJECTORY, AND NON-TRANSITORY COMPUTER-READABLE MEDIUM STORING COMPUTER PROGRAM THEREFOR

(71) Applicant: TOYOTA JIDOSHA KABUSHIKI KAISHA, Toyota (JP)

(72) Inventors: Shinichi Shiraishi, Saitama (JP); Hidetaka Fuse, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 204 days.

(21) Appl. No.: 18/148,525

(22) Filed: Dec. 30, 2022

(65) Prior Publication Data
US 2023/0227076 A1 Jul. 20, 2023

(30) Foreign Application Priority Data
Jan. 17, 2022 (JP) .................................. 2022-005158

(51) Int. Cl.
| | |
|---|---|
| *B60W 60/00* | (2020.01) |
| *B60W 30/00* | (2006.01) |
| *B60W 50/00* | (2006.01) |
| *G01C 21/00* | (2006.01) |
| *G01C 21/34* | (2006.01) |

(52) U.S. Cl.
CPC ...... *B60W 60/005* (2020.02); *B60W 50/0097* (2013.01); *B60W 60/001* (2020.02); *B60W 2420/403* (2013.01); *B60W 2420/408* (2024.01)

(58) Field of Classification Search
CPC ........... B60W 60/005; B60W 50/0097; B60W 60/001; B60W 2420/403; B60W 2420/408; B60W 2520/10; B60W 2554/40; B60W 2554/406; B60W 60/0057;
(Continued)

(56) References Cited

U.S. PATENT DOCUMENTS 11,807,272 B2 * 11/2023 Wulfe ...................... G06N 5/02
2019/0018410 A1    1/2019 Ando
(Continued)

FOREIGN PATENT DOCUMENTS

| | | |
|---|---|---|
| JP | 2019020782 A | 2/2019 |
| WO | 2018/073883 A1 | 4/2018 |

*Primary Examiner* — Tyler D Paige
(74) *Attorney, Agent, or Firm* — Dickinson Wright, PLLC (57) ABSTRACT

A device for generating a trajectory outputs, from first data generated by a first sensor, first object information indicating the position of an object in an area around the vehicle at generation of the first data and first predictive object information indicating a predicted position of an object in the area around the vehicle at a predetermined period after generation of the first data; outputs second object information indicating the position of an object in an area around the vehicle from second data generated by a second sensor; and generates a trajectory along which the vehicle will travel, using the first object information until the predetermined period before a changing time at which an autonomous driving level will change, using the first predictive object information from the predetermined period before the changing time until the changing time, and using the second object information after the changing time.

7 Claims, 5 Drawing Sheets

(58) Field of Classification Search
CPC .............. B60W 60/0051; B60W 30/10; G01C 21/3492; G01C 21/30; G01C 21/3446
USPC .......................................................... 701/25
See application file for complete search history.

(56) References Cited

U.S. PATENT DOCUMENTS

| | | |
|---|---|---|
| 2020/0047769 A1 | 2/2020 | Oguro et al. |
| 2020/0159216 A1* | 5/2020 | Le ........................ G05D 1/0214 |
| 2020/0307573 A1* | 10/2020 | Kato ................. B60W 60/0027 |
| 2021/0097351 A1* | 4/2021 | Stokman ............... G06F 18/241 |
| 2021/0191394 A1* | 6/2021 | Dudley ................ G05D 1/0061 |
| 2021/0302958 A1* | 9/2021 | Tschanz ............... G05D 1/0061 |
| 2022/0032957 A1* | 2/2022 | Wulfe ................ G01C 21/3407 |

* cited by examiner

DEVICE AND METHOD FOR GENERATING TRAJECTORY, AND NON-TRANSITORY COMPUTER-READABLE MEDIUM STORING COMPUTER PROGRAM THEREFOR

FIELD

The present disclosure relates to a device, a method, and a computer program for generating a trajectory of a vehicle.

BACKGROUND

A device for generating a trajectory generates a trajectory along which a vehicle will travel, using data appropriately selected from those pieces of data depending on the surroundings of the vehicle which are respectively outputted by sensors mounted on the vehicle.

International Publication No. 2018/073883 (hereafter "Patent Literature 1") describes a travel controller that continuously generates a target trajectory of autonomous driving regardless of switching between autonomous driving and manual driving. Upon switching from manual driving to autonomous driving, the travel controller described in Patent Literature 1 executes autonomous driving, using a previously generated target trajectory.

SUMMARY

To smoothly switch from an autonomous driving level to another autonomous driving level, the travel controller described in Patent Literature 1 requires continually generating data used for travel control at the autonomous driving levels before and after switching. Thus, to smoothly switch from an autonomous driving level to another autonomous driving level, the travel controller described in Patent Literature 1 requires many hardware resources.

It is an object of the present disclosure to provide a device that can generate a trajectory depending on switching between autonomous driving levels without excessively increasing hardware resources.

A device for generating a trajectory according to the present disclosure includes a processor configured to detect, from each piece of first data, the position of an object in an area around a vehicle at generation of the piece of first data to output first object information indicating the position. The first data is time-series data generated by a first sensor mounted on the vehicle and represents the surroundings of the vehicle. The processor further detects, from each piece of the first data, a predicted position of an object in the area around the vehicle at a predetermined period after generation of the piece of first data to output first predictive object information indicating the predicted position. The processor of the device further detects, from each piece of second data, the position of an object in an area around the vehicle to output second object information indicating the position. The second data is time-series data generated by a second sensor mounted on the vehicle and differing from the first sensor and represents the surroundings of the vehicle. The processor of the device further predicts whether an autonomous driving level at which travel of the vehicle is controlled will change from a first autonomous driving level at which a driver of the vehicle is under first watching obligation to a second autonomous driving level at which the driver is under second watching obligation different from the first watching obligation. When a change is predicted, the processor identifies a changing time of the predicted change.

The processor of the device further generates a trajectory along which the vehicle will travel, using the first object information until the predetermined period before the changing time, using the first predictive object information from the predetermined period before the changing time until the changing time, and using the second object information after the changing time.

In the device according to the present disclosure, the processor is, at outputting the first predictive object information, preferably further configured to calculate confidence of the first predictive object information and outputs confidence score information indicating the confidence, and the processor, at generating the trajectory, preferably generates the trajectory, using the first predictive object information and the confidence score information from the predetermined period before the changing time until the changing time.

In the device according to the present disclosure, the processor, at generating the trajectory, preferably generates the trajectory, using first predictive object information corresponding to the confidence score information when the confidence indicated by the confidence score information exceeds a confidence score threshold, and without using first predictive object information corresponding to the confidence score information when the confidence indicated by the confidence score information does not exceed the confidence score threshold.

In the device according to the present disclosure, the processor finishes outputting the first predictive object information and starts outputting the second object information, at the predetermined period before the changing time.

In the device according to the present disclosure, the processor, at outputting the first predictive object information, preferably outputs the first object information and the first predictive object information, using the first data when generation of the first data is the predetermined period or more before the changing time; and the processor preferably does not output the first object information or the first predictive object information, using the first data when generation of the first data is not the predetermined period or more before the changing time. The processor, at outputting the second object information, preferably does not output the second object information, using the second data when generation of the second data is the predetermined period or more before the changing time; and the processor preferably outputs the second object information, using the second data when generation of the second data is not the predetermined period or more before the changing time.

In the device according to the present disclosure, the processor, at outputting the first predictive object information, preferably outputs the first object information and the first predictive object information, using time-series environmental images generated by the first sensor depending on light focused by an optical system having a first focal length as the first data. The processor, at outputting the second object information, preferably outputs the second object information, using time-series environmental images generated by the second sensor depending on light focused by an optical system having a second focal length less than the first focal length as the second data.

A method for generating a trajectory according to the present disclosure includes detecting, from each piece of first data, the position of an object in an area around a vehicle at generation of the piece of first data to output first object information indicating the position. The first data is time-series data generated by a first sensor mounted on the vehicle and represents the surroundings of the vehicle. The method further includes detecting, from each piece of the first data, a predicted position of an object in the area around the vehicle at a predetermined period after generation of the piece of first data to output first predictive object information indicating the predicted position. The method further includes detecting, from each piece of second data, the position of an object in an area around the vehicle to output second object information indicating the position. The second data is time-series data generated by a second sensor mounted on the vehicle and differing from the first sensor and represents the surroundings of the vehicle. The method further includes predicting whether an autonomous driving level at which travel of the vehicle is controlled will change from a first autonomous driving level at which a driver of the vehicle is under first watching obligation to a second autonomous driving level at which the driver is under second watching obligation different from the first watching obligation. The method further includes identifying, when a change is predicted, a changing time of the predicted change. The method further includes generating a trajectory along which the vehicle will travel, using the first object information until the predetermined period before the changing time, using the first predictive object information from the predetermined period before the changing time until the changing time, and using the second object information after the changing time.

A computer program for generating a trajectory stored in a non-transitory computer-readable medium according to the present disclosure causes a computer mounted on a vehicle to execute a process including detecting, from each piece of first data, the position of an object in an area around the vehicle at generation of the piece of first data to output first object information indicating the position. The first data is time-series data generated by a first sensor mounted on the vehicle and represents the surroundings of the vehicle. The process further includes detecting, from each piece of the first data, a predicted position of an object in the area around the vehicle at a predetermined period after generation of the piece of first data and outputting first predictive object information indicating the predicted position. The process further includes detecting, from each piece of second data, the position of an object in an area around the vehicle to output second object information indicating the position. The second data is time-series data generated by a second sensor mounted on the vehicle and differing from the first sensor and represents the surroundings of the vehicle. The process further includes predicting whether an autonomous driving level at which travel of the vehicle is controlled will change from a first autonomous driving level at which a driver of the vehicle is under first watching obligation to a second autonomous driving level at which the driver is under second watching obligation different from the first watching obligation. The process further includes identifying, when a change is predicted, a changing time of the predicted change. The process further includes generating a trajectory along which the vehicle will travel, using the first object information until the predetermined period before the changing time, using the first predictive object information from the predetermined period before the changing time until the changing time, and using the second object information after the changing time.

The device according to the present disclosure can generate a trajectory depending on switching between autonomous driving levels without excessively increasing hardware resources.

DESCRIPTION OF EMBODIMENTS

A device that can generate a trajectory depending on switching between autonomous driving levels without excessively increasing hardware resources will now be described in detail with reference to the attached drawings. The device for generating a trajectory predicts whether an autonomous driving level at which travel of a vehicle is controlled will change from a first autonomous driving level at which a driver of the vehicle is under first watching obligation to a second autonomous driving level at which the driver is under second watching obligation different from the first watching obligation, and, when a change is predicted, identifies a changing time of the predicted change. The device generates a trajectory along which the vehicle will travel, using first object information until a predetermined period before the changing time, using first predictive object information from the predetermined period before the changing time until the changing time, and using second object information after the changing time. The first object information indicates the position of an object in an area around the vehicle at generation of a piece of first data, and the first predictive object information indicates a predicted position of an object in the area around the vehicle at the predetermined period after generation of the piece of first data. The object is detected from each piece of first data, which is time-series data generated by a first sensor mounted on the vehicle and represents the surroundings of the vehicle. The second object information indicates the position of an object in an area around the vehicle detected from each piece of second data, which is time-series data generated by a second sensor mounted on the vehicle and differing from the first sensor and represents the surroundings of the vehicle.

Figure 1:
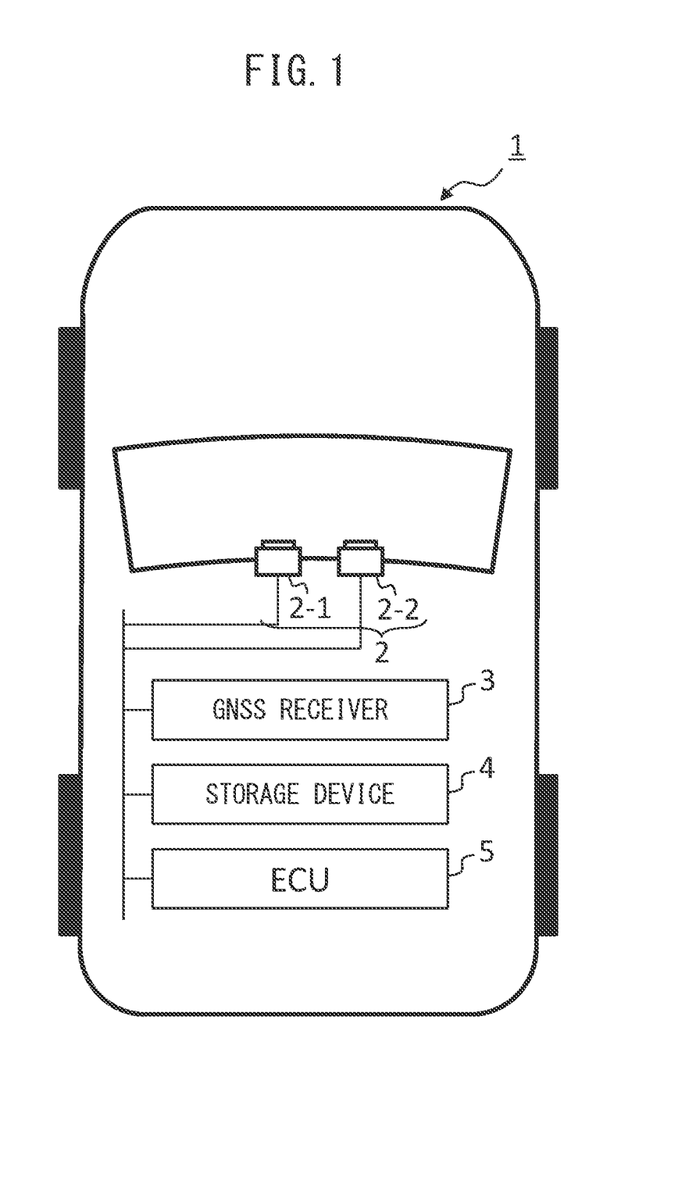
FIG. 1 schematically illustrates the configuration of a vehicle equipped with a device for generating a trajectory.

FIG. 1 schematically illustrates the configuration of a vehicle equipped with the device for generating a trajectory. The vehicle 1 includes an environmental camera 2, a global navigation satellite system (GNSS) receiver 3, a storage device 4, and an electronic control unit (ECU) 5. The ECU 5 is an example of the device for generating a trajectory. The environmental camera 2, the GNSS receiver 3, and the storage device 4 are communicably connected to the ECU 5 via an in-vehicle network conforming to a standard such as a controller area network.

The environmental camera 2 includes a two-dimensional detector constructed from an array of optoelectronic transducers, such as CCD or C-MOS, having sensitivity to visible light and a focusing optical system that forms an image of a target region on the two-dimensional detector. The environmental camera 2 is disposed, for example, in a front and upper area in the interior of the vehicle and oriented forward, takes a picture of the surroundings of the vehicle 1 through a windshield every predetermined capturing period (e.g., 1/30 to 1/10 seconds), and outputs environmental images representing the surroundings as first or second data. The environmental camera 2 includes a telephotographic camera 2-1 and a wide-angle camera 2-2.

The telephotographic camera 2-1 and the wide-angle camera 2-2 are an example of the first and second sensors for detecting the surroundings of the vehicle 1, respectively. The focusing optical system of the telephotographic camera 2-1 has a focal length longer than that of the wide-angle camera 2-2. The number of cameras constituting the environmental camera 2 may be three or more.

As the first or second sensor, the vehicle may include a light detection and ranging (LiDAR) sensor or a radio detection and ranging (RADAR) sensor. The LiDAR or RADAR sensor outputs a range image whose pixels each have a value depending on the distance to an object represented in the pixel, based on the surroundings of the vehicle 1, as the first or second data.

The GNSS receiver 3 receives GNSS signals from GNSS satellites at predetermined intervals, and determines the position of the vehicle 1, based on the received GNSS signals. The GNSS receiver 3 outputs a positioning signal indicating the result of determination of the position of the vehicle 1 based on the GNSS signals to the ECU 5 via the in-vehicle network at predetermined intervals.

The storage device 4, which is an example of a storage unit, includes, for example, a hard disk drive or a nonvolatile semiconductor memory. The storage device 4 stores map data including information on features such as lane-dividing lines in association with their positions.

The ECU 5 identifies a changing time at which an autonomous driving level will change, using map data around the position corresponding to a positioning signal outputted by the GNSS receiver 3, selects data outputted by the environmental camera 2, depending on the interval until the changing time, and generates a trajectory along which the vehicle 1 will travel. In addition, the ECU 5 executes a travel control process to transmit control signals to a travel mechanism including an engine or a motor, a brake, and steering so that the vehicle 1 travels along the generated trajectory. Besides the ECU 5, the vehicle 1 may further include another ECU, which may execute the travel control process.

Figure 2:
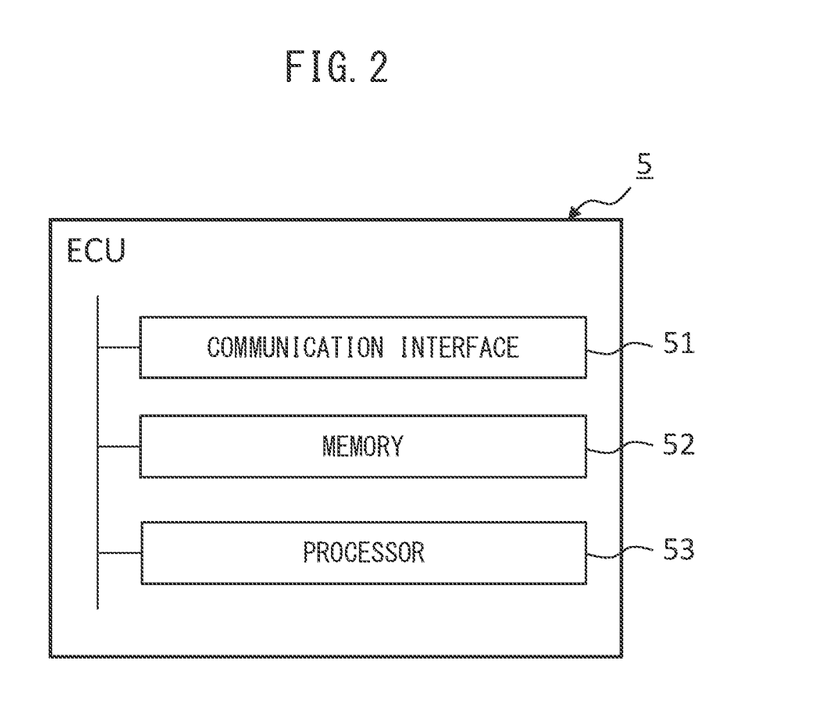
FIG. 2 illustrates the hardware configuration of an ECU.

FIG. 2 schematically illustrates the hardware configuration of the ECU 5. The ECU 5 includes a communication interface 51, a memory 52, and a processor 53.

The communication interface 51, which is an example of a communication unit, includes a communication interface circuit for connecting the ECU 5 to the in-vehicle network. The communication interface 51 provides received data for the processor 53, and outputs data provided from the processor 53 to an external device.

The memory 52 includes volatile and nonvolatile semiconductor memories. The memory 52 stores various types of data used for processing by the processor 53, such as information indicating a predetermined period for changing information used for generating a trajectory based on the interval until the time of a change of an autonomous driving level. The memory 52 temporarily stores those positions of an object in a surrounding area at generation of respective environmental images which are detected from the environmental image. The memory 52 also stores various application programs, such as a trajectory generation program for executing a trajectory generation process.

The processor 53, which is an example of a control unit, includes one or more processors and a peripheral circuit thereof. The processor 53 may further include another operating circuit, such as a logic-arithmetic unit, an arithmetic unit, or a graphics processing unit.

Figure 3:
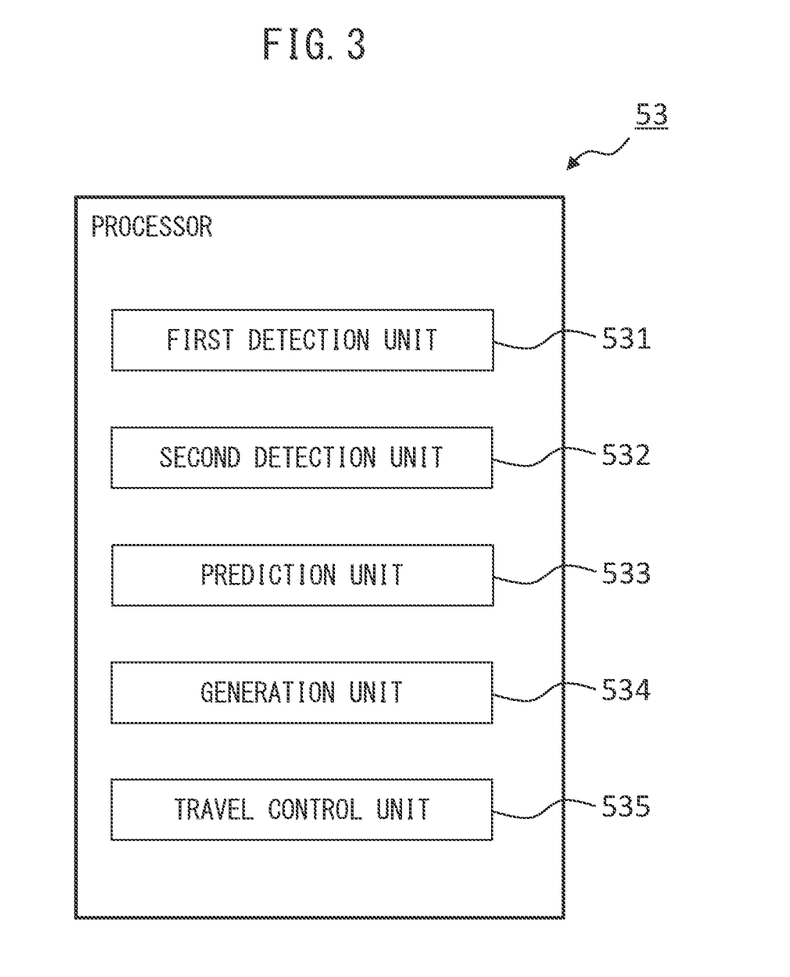
FIG. 3 is a functional block diagram of a processor included in the ECU.
Figure 4:
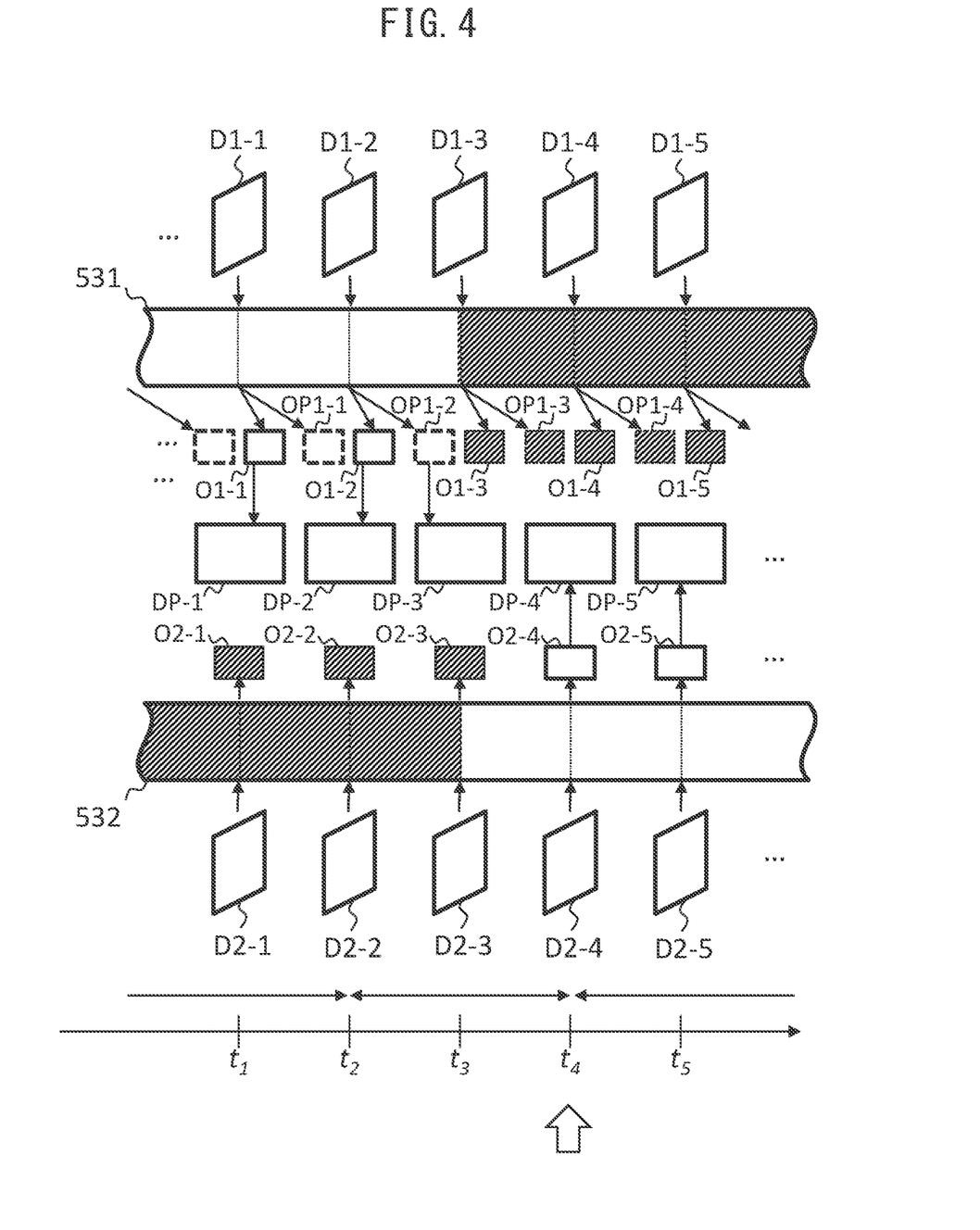
FIG. 4 illustrates an example of generation of a trajectory using first and second data.

FIG. 3 is a functional block diagram of the processor 53 included in the ECU 5. FIG. 4 illustrates an example of generation of a trajectory using first and second data.

As its functional blocks, the processor 53 of the ECU 5 includes a first detection unit 531, a second detection unit 532, a prediction unit 533, a generation unit 534, and a travel control unit 535. These units included in the processor 53 are functional modules implemented by a computer program stored in the memory 52 and executed by the processor 53. The computer program for achieving the functions of the units of the processor 53 may be provided in a form recorded on a computer-readable and portable medium, such as a semiconductor memory, a magnetic medium, or an optical medium. Alternatively, the units included in the processor 53 may be implemented in the ECU 5 as separate integrated circuits, microprocessors, or firmware.

From each of time-series environmental images generated by the telephotographic camera 2-1, the first detection unit 531 detects the position of an object in an area around the vehicle 1 at generation of the environmental image, and outputs first object information indicating the position.

The first detection unit 531 detects an object such as a vehicle in the area around the vehicle 1 by inputting an environmental image outputted by the telephotographic camera 2-1 into a classifier that has been trained to detect a predetermined object represented in an environmental image.

The classifier may be, for example, a convolutional neural network (CNN) including convolution layers connected in series from the input toward the output. A CNN that has been trained using inputted images representing predetermined detection target objects as training data operates as a classifier for detecting an object.

The first detection unit 531 estimates the real-space position of the detected object, using the current position and orientation of the vehicle 1, the direction from the vehicle 1 to the object, and an estimated distance from the vehicle 1 to the object, and outputs the estimated position as first object information.

The first detection unit 531 identifies the current position of the vehicle 1, based on a positioning signal obtained from the GNSS receiver 3. The first detection unit 531 may identify the orientation of the vehicle 1 by detecting features such as lane-dividing lines from the environmental image and comparing the detected features with corresponding features represented in the map data stored in the storage device 4.

The first detection unit 531 estimates the direction from the vehicle 1 to the object, using the position of the object in the environmental image, the focal length of the focusing optical system of the telephotographic camera 2-1, and the inclination of the optical axis of the focusing optical system of the telephotographic camera 2-1 relative to the travel direction of the vehicle 1.

The first detection unit 531 estimates the distance from the vehicle 1 to the object, based on a reference size of the object stored in the memory 52, the size of the object represented in the environmental image, and internal parameters such as the focal length of the focusing optical system of the telephotographic camera 2-1 and the pixel size of the environmental image.

From each of time-series environmental images generated by the telephotographic camera 2-1, the first detection unit 531 detects a predicted position of an object in the area around the vehicle 1 at a predetermined period after generation of the environmental image, and outputs first predictive object information indicating the predicted position.

The first detection unit 531 tracks an object detected from time-series environmental images outputted by the telephotographic camera 2-1, and detects a predicted position of the object from a trajectory obtained from the result of tracking. The first detection unit 531 can track the object, using, for example, a Kalman filter or a particle filter to execute a tracking process on the positions of the object at generation of the respective environmental images detected from the time-series environmental images. In the tracking process may be used odometry information indicating the current position of the vehicle 1 estimated on the basis of the rotation angle of wheels of the vehicle 1.

The first detection unit 531 may calculate the confidence of the predicted position indicated by the first predictive object information, and output confidence score information indicating the confidence. For example, the first detection unit 531 outputs the confidence score information so that the confidence of the predicted position is higher as an estimated error variance of the predicted position in the tracking process is smaller.

The first detection unit 531 may, at generation of the respective environmental images detected from the time-series environmental images, input the positions of the object into a classifier that is a neural network, thereby detect the predicted position of the object. The classifier is trained in advance, using the positions of objects in the surrounding area, the real-space positions of the objects after the predetermined period, the positions and the directions of the optical axis of the camera at generation of the respective images, and the distances from the camera to the predetermined objects as training data. The classifier may output the confidence of the predicted position together with the predicted position of the object.

The first detection unit 531 may detect the predicted position of the object, based on the amount of change in the position of the object indicated by the first object information outputted as time-series data.

In FIG. 4, the telephotographic camera 2-1 generates time-series environmental images D1-1 to D1-5 at respective times $t_1$-$t_5$ separated at unit-time intervals. The first detection unit 531 outputs first object information O1-1 indicating the position of an object from the environmental image D1-1 generated at time $t_1$. The first detection unit 531 also outputs first predictive object information OP1-1 indicating a predicted position of the object at time $t_2$ one unit time after time $t_1$ at which the environmental image D1-1 is generated. In other words, the predetermined period is one unit time in the example of FIG. 4.

The shaded portions in FIG. 4 indicate that no data is generated or no process is executed with data (OFF state). In the example of FIG. 4, time $t_4$ is identified as a changing time by the prediction unit 533 described below. The first detection unit 531 changes its operating state from ON to OFF at time $t_3$ the predetermined period before changing time $t_4$, and thereafter outputs neither first object information nor first predictive object information. The telephotographic camera 2-1, which generates environmental images used for the detection process by the first detection unit 531, may change its operating state from ON to OFF at time $t_3$ together with the first detection unit 531.

From each of time-series environmental images generated by the wide-angle camera 2-2, the second detection unit 532 detects the position of an object in an area around the vehicle 1 at generation of the environmental image, and outputs second object information indicating the position.

The second detection unit 532 detects the position of an object such as a vehicle in the area around the vehicle 1 by inputting an environmental image outputted by the wide-angle camera 2-2 into a classifier that has been trained to detect a predetermined object represented in an environmental image.

The classifier may be, for example, a CNN. A CNN that has been trained using inputted images representing predetermined detection target objects as training data operates as a classifier for detecting an object.

In FIG. 4, the wide-angle camera 2-2 generates time-series environmental images D2-1 to D2-5 at respective times $t_1$-$t_5$. The second detection unit 532 outputs second object information O2-3 indicating the position of an object from the environmental image D2-3 generated at time $t_3$.

The second detection unit 532 changes its operating state from OFF to ON at time $t_3$ the predetermined period before changing time $t_4$, and then starts outputting second object information. The wide-angle camera 2-2, which generates environmental images used for the detection process by the second detection unit 532, may be OFF until time $t_3$ and change its operating state from OFF to ON at time $t_3$ together with the second detection unit 532.

The prediction unit 533 predicts whether an autonomous driving level at which travel of the vehicle 1 is controlled will change, and, when a change is predicted, identifies a changing time of the predicted change.

The prediction unit 533 obtains the current autonomous driving level from the travel control unit 535 described below. Autonomous driving levels include a first autonomous driving level at which the driver is obliged to watch around, and a second autonomous driving level at which the driver is not obliged to watch ahead.

For example, assume that the vehicle is traveling at 80 kilometers an hour at the first autonomous driving level, at which the driver is obliged to watch around, and that switching from the first autonomous driving level to the second autonomous driving level, at which the driver is not obliged to watch ahead, is allowed when the vehicle speed is reduced to 30 kilometers an hour, for example, because of a traffic jam. In this case, the prediction unit 533 obtains traffic information indicating a traffic situation, such as a traffic jam or traffic restrictions on a travel route via a data communication module (not shown) connected to the in-vehicle network, a wireless base station (not shown), and a communication network (not shown).

Based on the obtained traffic information, the prediction unit 533 estimates the location where control at the current autonomous driving level will be finished. The prediction unit 533 then adds the time, obtained by dividing the distance from the current position to the location where control at the current autonomous driving level will be finished by a standard speed under control at the autonomous driving level, to the current time, thereby identifying the changing time. In the example of FIG. 4, the prediction unit 533 identifies the changing time as $t_4$.

Alternatively, the prediction unit 533 may obtain map data around the position corresponding to a positioning signal outputted by the GNSS receiver 3 from the storage device 4. The prediction unit 533 identifies the endpoint of the lane that can be traveled at the current autonomous driving level, and adds the time, obtained by dividing the distance from the current location to the endpoint by a standard speed under control at the autonomous driving level, to the current time, thereby identifying the changing time.

The generation unit 534 generates a trajectory along which the vehicle 1 will travel, using information indicating the position of an object detected from environmental data generated by the environmental camera 2.

The generation unit 534 estimates a predicted future position of the object, using the position of the object at the previous time which is temporarily stored in the memory 52 as well as the first object information or the first predictive object information outputted by the first detection unit 531 or the second object information outputted by the second detection unit 532.

The generation unit 534 generates a trajectory of the vehicle 1 so as to maintain a predetermined distance from the estimated predicted future position of the object.

Until the predetermined period before the changing time, the generation unit 534 generates a trajectory, using the first object information. From the predetermined period before the changing time until the changing time, the generation unit 534 generates a trajectory, using the first predictive object information. After the changing time, the generation unit 534 generates a trajectory, using the second object information.

In the example of FIG. 4, until one unit time before changing time $t_4$, i.e., until time $t_3$, the generation unit 534 generates a trajectory, using the first object information. For example, the generation unit 534 generates a trajectory DP-2 at time $t_2$, using first object information O1-2 corresponding to the environmental image D1-2 generated by the telephotographic camera 2-1.

From one unit time before changing time $t_4$, i.e., from time $t_3$ until changing time $t_4$, the generation unit 534 generates a trajectory DP-3, using first predictive object information OP1-2 corresponding to the environmental image D1-2 generated by the telephotographic camera 2-1.

The generation unit 534 may generate the trajectory DP-3, using the first predictive object information OP1-2 and confidence score information indicating the confidence of the first predictive object information OP1-2. For example, when the confidence indicated by the confidence score information exceeds a predetermined confidence score threshold, the generation unit 534 generates the trajectory DP-3, assuming that an object exists at the position indicated by the first predictive object information OP1-2. When the confidence indicated by the confidence score information does not exceed the predetermined confidence score threshold, the generation unit 534 generates the trajectory DP-3 without using the first predictive object information OP1-2, assuming that no object exists at the position indicated by the first predictive object information OP1-2.

After changing time $t_4$, the generation unit 534 generates a trajectory, using the second object information. For example, the generation unit 534 generates a trajectory DP-4 at time $t_4$, using second object information O2-4 corresponding to the environmental image D2-4 generated by the wide-angle camera 2-2.

Figure 5:
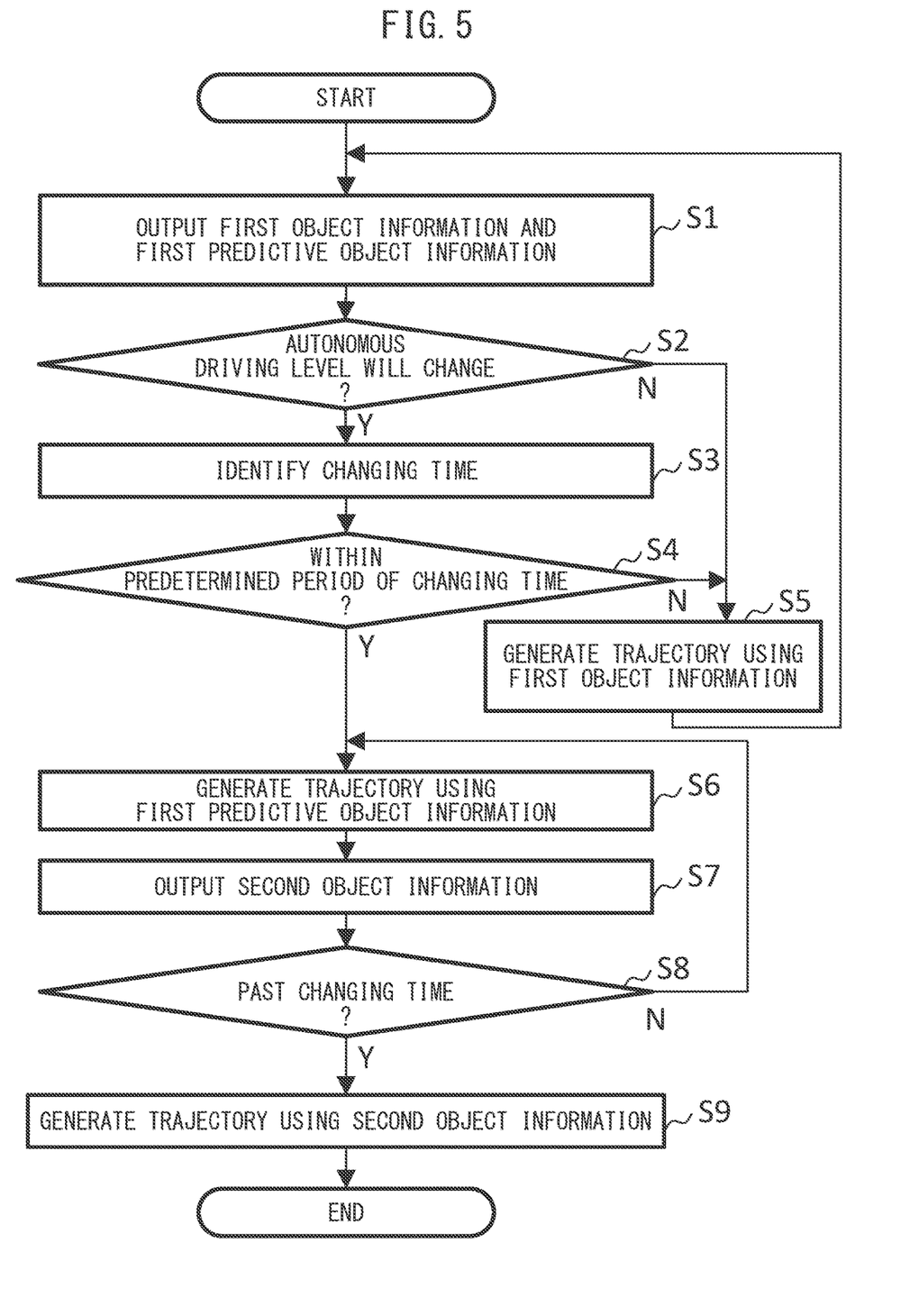
FIG. 5 is a flowchart of a trajectory generation process.

FIG. 5 is a flowchart of a trajectory generation process. The ECU 5 repeatedly executes the trajectory generation process at predetermined intervals during travel of the vehicle 1 under autonomous driving control.

First, from each of time-series environmental images generated by the telephotographic camera 2-1, the first detection unit 531 of the ECU 5 detects the position of an object in a surrounding area at generation of the environmental image, and outputs first object information indicating the position. The first detection unit 531 also detects a predicted position of the object at a predetermined period after generation of the environmental image, and outputs first predictive object information indicating the predicted position (step S1).

The prediction unit 533 of the ECU 5 predicts whether the autonomous driving level of the vehicle 1 will change from the first autonomous driving level to the second autonomous driving level (step S2). When no change of the autonomous driving level is predicted (No in step S2), the process by the ECU 5 proceeds to step S5 described below. When a change of the autonomous driving level is predicted (Yes in step S2), the prediction unit 533 identifies a changing time at which the autonomous driving level will change (step S3).

The generation unit 534 of the ECU 5 determines whether the interval from the current time until the changing time is within the predetermined period, i.e., whether the current time is the predetermined period before the changing time (step S4). When it is determined that the interval from the current time until the changing time is not within the predetermined period (No in step S4), the generation unit 534 generates a trajectory, using the first object information (step S5), and the process by the ECU 5 returns to step S1.

When it is determined that the interval from the current time until the changing time is within the predetermined period (Yes in step S4), the generation unit 534 generates a trajectory, using the first predictive object information (step S6).

The second detection unit 532 of the ECU detects the position of an object in a surrounding area from each of time-series environmental images generated by the wide-angle camera 2-2, and outputs second object information indicating the position (step S7).

The generation unit 534 determines whether the current time is past the changing time, i.e., whether the current time is after the changing time (step S8). When it is determined that the current time is not past the changing time (No in step S8), the process by the ECU 5 returns to step S6.

When it is determined that the current time is past the changing time (Yes in step S8), the generation unit 534 generates a trajectory, using the second object information (step S9) and terminates the trajectory generation process.

In the case where the trajectory generation process is finished and then executed again, the second detection unit in the first execution of the trajectory generation process may operate as the first detection unit in the second execution of the trajectory generation process. This operation enables the ECU 5 to generate a trajectory appropriately even in the case where the autonomous driving level is changed from a first level to a second level and then changed to another level.

By executing the trajectory generation process in this way, the ECU 5 can generate a trajectory depending on switching between autonomous driving levels without excessively increasing hardware resources.

Note that those skilled in the art can make various changes, substitutions, and modifications without departing from the spirit and scope of the present disclosure.

What is claimed is:

1. A device for generating a trajectory, comprising a processor configured to:
   detect, from each piece of first data, the position of an object in an area around a vehicle at generation of the piece of first data to output first object information indicating the position, wherein the first data is time-series data generated by a first sensor mounted on the vehicle and represents the surroundings of the vehicle,
   detect, from each piece of the first data, a predicted position of an object in the area around the vehicle at a predetermined period after generation of the piece of the first data to output first predictive object information indicating the predicted position,
   detect, from each piece of second data, the position of an object in an area around the vehicle to output second object information indicating the position, wherein the second data is time-series data generated by a second sensor mounted on the vehicle and differing from the first sensor and represents the surroundings of the vehicle, predict whether an autonomous driving level at which travel of the vehicle is controlled will change from a first autonomous driving level at which a driver of the vehicle is under first watching obligation to a second autonomous driving level at which the driver is under second watching obligation different from the first watching obligation, identify, when a change in autonomous driving level is predicted, a changing time of the predicted change, and generate a trajectory along which the vehicle will travel, using the first object information until the predetermined period before the changing time, using the first predictive object information from the predetermined period before the changing time until the changing time, and using the second object information after the changing time;

wherein at outputting the first predictive object information, the processor outputs the first object information and the first predictive object information, using time-series environmental images generated by the first sensor depending on light focused by an optical system having a first focal length as the first data; and at outputting the second object information, the processor outputs the second object information, using time-series environmental images generated by the second sensor depending on light focused by an optical system having a second focal length shorter than the first focal length as the second data.

2. The device according to claim 1, wherein at outputting the first predictive object information, the processor is further configured to calculate confidence of the first predictive object information and outputs confidence score information indicating the confidence; and at generating the trajectory, the processor generates the trajectory, using the first predictive object information and the confidence score information from the predetermined period before the changing time until the changing time.

3. The device according to claim 2, wherein at generating the trajectory, the processor generates the trajectory, using first predictive object information corresponding to the confidence score information when the confidence indicated by the confidence score information exceeds a confidence score threshold, and without using first predictive object information corresponding to the confidence score information when the confidence indicated by the confidence score information does not exceed the confidence score threshold.

4. The device according to claim 1, wherein the processor finishes outputting the first predictive object information and starts outputting the second object information, at the predetermined period before the changing time.

5. The device according to claim 4, wherein at outputting the first predictive object information, the processor outputs the first object information and the first predictive object information, using the first data when generation of the first data is the predetermined period or more before the changing time; and the processor does not output the first object information or the first predictive object information, using the first data when generation of the first data is not the predetermined period or more before the changing time; and at outputting the second object information, the processor does not output the second object information, using the second data when generation of the second data is the predetermined period or more before the changing time; and the processor outputs the second object information, using the second data when generation of the second data is not the predetermined period or more before the changing time.

6. A method for generating a trajectory, comprising:

detecting, from each piece of first data, the position of an object in an area around a vehicle at generation of the piece of first data to output first object information indicating the position, wherein the first data is time-series data generated by a first sensor mounted on the vehicle and represents the surroundings of the vehicle;

detecting, from each piece of the first data, a predicted position of an object in the area around the vehicle at a predetermined period after generation of the piece of first data to output first predictive object information indicating the predicted position;

detecting, from each piece of second data, the position of an object in an area around the vehicle to output second object information indicating the position, wherein the second data is time-series data generated by a second sensor mounted on the vehicle and differing from the first sensor and represents the surroundings of the vehicle;

predicting whether an autonomous driving level at which travel of the vehicle is controlled will change from a first autonomous driving level at which a driver of the vehicle is under first watching obligation to a second autonomous driving level at which the driver is under second watching obligation different from the first watching obligation;

identifying, when a change in autonomous driving level is predicted, a changing time of the predicted change;

generating a trajectory along which the vehicle will travel, using the first object information until the predetermined period before the changing time, using the first predictive object information from the predetermined period before the changing time until the changing time, and using the second object information after the changing time;

outputting the first predictive object information, the processor outputs the first object information and the first predictive object information, using time-series environmental images generated by the first sensor depending on light focused by an optical system having a first focal length as the first data; and outputting the second object information, the processor outputs the second object information, using time-series environmental images generated by the second sensor depending on light focused by an optical system having a second focal length shorter than the first focal length as the second data.

7. A non-transitory computer-readable medium storing a computer program for generating a trajectory, the computer program causing a computer mounted on a vehicle to execute a process comprising:

detecting, from each piece of first data, the position of an object in an area around the vehicle at generation of the piece of first data to output first object information indicating the position, wherein the first data is time-series data generated by a first sensor mounted on the vehicle and represents the surroundings of the vehicle;

detecting, from each piece of the first data, a predicted position of an object in the area around the vehicle at a predetermined period after generation of the piece of first data to output first predictive object information indicating the predicted position;

detecting, from each piece of second data, the position of an object in an area around the vehicle to output second object information indicating the position, wherein the second data is time-series data generated by a second sensor mounted on the vehicle and differing from the first sensor and represents the surroundings of the vehicle;

predicting whether an autonomous driving level at which travel of the vehicle is controlled will change from a first autonomous driving level at which a driver of the vehicle is under first watching obligation to a second autonomous driving level at which the driver is under second watching obligation different from the first watching obligation;

identifying, when a change in autonomous driving level is predicted, a changing time of the predicted change;

generating a trajectory along which the vehicle will travel, using the first object information until the predetermined period before the changing time, using the first predictive object information from the predetermined period before the changing time until the changing time, and using the second object information after the changing time;

outputting the first predictive object information, the processor outputs the first object information and the first predictive object information, using time-series environmental images generated by the first sensor depending on light focused by an optical system having a first focal length as the first data; and outputting the second object information, the processor outputs the second object information, using time-series environmental images generated by the second sensor depending on light focused by an optical system having a second focal length shorter than the first focal length as the second data.

\* \* \* \* \*